United States Patent
Nakama et al.

(10) Patent No.: US 9,927,583 B2
(45) Date of Patent: Mar. 27, 2018

(54) OPTICAL CONNECTOR AND OPTICAL CONNECTOR FERRULE

(71) Applicant: FUJIKURA LTD., Kohtoh-ku, Tokyo (JP)

(72) Inventors: Akihiro Nakama, Sakura (JP); Shigeo Takahashi, Sakura (JP); Kazuhiro Takizawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/668,575

(22) Filed: Mar. 25, 2015

(65) Prior Publication Data

US 2015/0198773 A1 Jul. 16, 2015

Related U.S. Application Data

(63) Continuation-in-part of application No. 13/324,263, filed on Dec. 13, 2011, now abandoned, which is a
(Continued)

(30) Foreign Application Priority Data

Jan. 14, 2010 (JP) ................................ 2010-006291

(51) Int. Cl.
*G02B 6/38* (2006.01)
*G02B 6/255* (2006.01)

(52) U.S. Cl.
CPC ......... *G02B 6/3846* (2013.01); *G02B 6/3885* (2013.01); *G02B 6/2558* (2013.01);
(Continued)

(58) Field of Classification Search
None
See application file for complete search history.

(56) References Cited

U.S. PATENT DOCUMENTS 6,085,003 A 7/2000 Knight
6,186,672 B1 2/2001 Takizawa et al.
(Continued)

FOREIGN PATENT DOCUMENTS

JP 63-118108 A 5/1988
JP 08-106028 A 4/1996
(Continued)

OTHER PUBLICATIONS

Japanese Standards Association, "Electronics", JIS handbook 8, Test methods and Optoelectronics Edition, 1998, pp. 1660-1675 and 2164.
(Continued)

*Primary Examiner* — Tina Wong
(74) *Attorney, Agent, or Firm* — Sughrue Mion, PLLC

(57) ABSTRACT

An optical connector comprises a housing, a regulating portion which is protrudes toward an inner surface of the housing, a ferrule which is secured to an optical fiber and which is accommodated inside the housing so as to be movable. The ferrule includes a base portion and a thinned portion that has a thickness smaller than that of the base portion. If the ferrule moves forward in the butt-connection direction, the regulating portion and the base portion approach each other, so that the regulating portion regulates the movement of the ferrule in the thickness direction. If the ferrule moves backward in the butt-connection direction, the ferrule reaches a position where the thinned portion faces the regulating portion, so that the movement of the ferrule in the thickness direction is not regulated by the regulating portion.

8 Claims, 15 Drawing Sheets

Related U.S. Application Data continuation of application No. PCT/JP2011/050515, filed on Jan. 14, 2011.

(52) U.S. Cl.
CPC ............ *G02B 6/387* (2013.01); *G02B 6/3847* (2013.01); *G02B 6/3853* (2013.01); *G02B 6/3887* (2013.01)

(56) References Cited

U.S. PATENT DOCUMENTS

| | | | |
|---|---|---|---|
| 6,402,388 | B1 | 6/2002 | Imazu et al. |
| 6,530,696 | B1 | 3/2003 | Ueda et al. |
| 6,572,275 | B2 | 6/2003 | Shimoji et al. |
| 6,619,859 | B1 | 9/2003 | Minamino et al. |
| 6,676,299 | B1 | 1/2004 | Durrant et al. |
| 8,457,458 | B2 * | 6/2013 | Kadar-Kallen .......... G02B 6/06 385/33 |
| 2002/0186931 | A1 | 12/2002 | Seo et al. |
| 2006/0245694 | A1 * | 11/2006 | Chen ..................... G02B 6/32 385/71 |
| 2012/0082418 | A1 | 4/2012 | Takahashi et al. |
| 2012/0093462 | A1 * | 4/2012 | Childers .............. G02B 6/3831 385/33 |

FOREIGN PATENT DOCUMENTS

| | | |
|---|---|---|
| JP | 10-123366 A | 5/1998 |
| JP | 11-064684 A | 3/1999 |
| JP | 11-072655 A | 3/1999 |
| JP | 11-242136 A | 9/1999 |
| JP | 11-305073 A | 11/1999 |
| JP | 11-305074 A | 11/1999 |
| JP | 11-316321 A | 11/1999 |
| JP | 11-316322 A | 11/1999 |
| JP | 2002-196186 A | 7/2002 |
| JP | 2002-196189 A | 7/2002 |
| JP | 2002-318324 A | 10/2002 |
| JP | 2004-138917 A | 5/2004 |

OTHER PUBLICATIONS

Office Action issued by Japanese Patent Office in Japanese Application No. 2011-522320 dated Jul. 2, 2013.

Notice of Allowance issued in Japanese Patent Office in Japanese Application No. 2011-522320 dated Sep. 24, 2013.

Office Action issued by Chinese Patent Office in Chinese Application No. 201180001358.0 dated Aug. 28, 2013.

Office Action issued by Chinese Patent Office in Chinese Application No. 201180001358.0 dated Jul. 15, 2014.

Office Action issued by U.S. Patent Office in U.S. Appl. No. 13/324,263 dated Aug. 6, 2014.

Office Action issued by U.S. Patent Office in U.S. Appl. No. 13/324,263 dated Mar. 20, 2015.

Communication dated Nov. 9, 2017, issued by the European Patent Office in corresponding European Application No. 11732947.4.

\* cited by examiner

OPTICAL CONNECTOR AND OPTICAL CONNECTOR FERRULE

CROSS REFERENCE TO RELATED APPLICATIONS

This application is a continuation-in-part of application of Ser. No. 13/324,263, Dec. 13, 2011, which is a continuation application based on a PCT Patent Application No. PCT/JP2011/050515, filed Jan. 14, 2011, whose priority is claimed on Japanese Patent Application No. 2010-006291 filed Jan. 14, 2010, the entire contents of which are hereby incorporated by reference.

BACKGROUND OF THE INVENTION

Field of the Invention

The present invention relates to an optical connector that is assembled to a front end of a light propagating body such as an optical fiber cord or an optical fiber cable, and is relates to an optical connector ferrule that is used to the optical connector.

Description of the Related Art

As an optical connector, for example, there is known a structure in which a guide pin positioning type ferrule is accommodated in a cylindrical housing as in an MPO type optical connector (stipulated in JIS C5982 and the like, MPO: Multi-fiber Push On) (for example, see Japanese Unexamined Patent Application, First Publication No. 2002-196189).

In the optical connector, the movement of the ferrule is generally regulated by the housing in order to reliably fit the guide pin during butt-connection.

For this reason, if the optical connector is largely inclined or the housing is largely bent when the optical fiber is laterally pulled (so-called side-pull) in the state where the optical connector is connected to an optical connector of a counter connection part inside an optical connector adapter, an excessive force is exerted on the ferrule due to the housing, which may cause a problem in that the ferrule may be broken or the state of the butt-connection between the ferrules may be affected.

SUMMARY

The invention is made in view of such circumstances, and it is an object of the invention to provide an optical connector and an optical connector ferrule capable of reliably fitting a guide pin at the time of connection and preventing side-pull adversely affecting a ferrule and a connection state thereof.

An aspect of the invention provides an optical connector which includes a housing; a regulating portion which protrudes toward an inner surface of the housing; a ferrule which is secured to an optical fiber, and which is accommodated inside the housing so as to be movable in a butt-connection direction, wherein the ferrule comprises: a base portion, which has a first thickness extending in a thickness direction that is perpendicular to the butt-connection direction; and a thinned portion, which is formed at a front side of the base portion and has a second thickness that is smaller than the first thickness, wherein if the ferrule moves forward in the butt-connection direction, the regulating portion and the base portion approach each other so that the regulating portion regulates the movement of the ferrule in the thickness direction, and wherein if the ferrule moves backward in the butt-connection direction, the regulating portion and the thinned portion separate from each other so that the movement of the ferrule in the thickness direction is not regulated by the regulating portion.

In the optical connector of the aspect of the invention, a plurality of regulating portions may be provided at upper and lower inner surfaces of the housing.

In the optical connector of the aspect of the invention, the housing may accommodate an inserting optical fiber having an end portion fixed to an end surface of the ferrule at a joint portion, and another end portion connected to the optical fiber, and a joint reinforced portion which reinforces the joint portion.

Another aspect of the invention provides an optical connector ferrule which is secured to an optical fiber in a butt-connection direction, and which is insertable into a housing of an optical connector, the ferrule comprises a base portion having a thickness in a thickness direction that is perpendicular to the butt-connection direction; a thinned portion that is in front of the base portion and has a thickness smaller than the thickness of the base portion, wherein the ferrule is movable in the butt-connection direction; wherein if the ferrule moves forward in the butt-connection direction, the base portion moves toward an inner surface of the housing and movement of the ferrule in the thickness direction is regulated as the base portion approaches the housing, and wherein if the ferrule moves backward in the butt-connection direction, the movement of the ferrule in the thickness direction is released as the thinned portion separates from the housing.

An aspect of the invention provides an optical connector which includes a housing; a regulating portion which serves as a protrusion protruding inward from the inner surface of the front end of the housing; and a ferrule which is secured to an optical fiber, and which is accommodated inside the housing so as to be movable in a butt-connection direction, wherein the ferrule comprises: a body portion with a joint end surface; and a locking convex portion formed at a rear side of the body portion so as to protrude from a side portion of the ferrule; the body portion comprises: a base portion having a side surface on which an opening communicating with an inner portion of the base portion is not provided, the side surface extending along a front-rear direction of the ferrule, the base portion being disposed at a front side of the locking convex portion so as to be adjacent to the locking convex portion, the base portion having a first thickness extending in a thickness direction that is perpendicular to the butt-connection direction, the locking convex portion having a second thickness, and the first thickness of the base portion being smaller than the second thickness of the locking convex portion; and a thinned portion, which is formed adjacently at a front side of the base portion and has a third thickness that is smaller than the first thickness; wherein if the ferrule moves forward in the butt-connection direction, the regulating portion and the base portion approach each other so that the regulating portion regulates the movement of the ferrule in the thickness direction; and wherein if the ferrule moves backward in the butt-connection direction, the regulating portion and the thinned portion separate from each other so that the movement of the ferrule in the thickness direction is not regulated by the regulating portion.

In the optical connector of the aspect of the invention, a plurality of regulating portions may be provided at upper and lower inner surfaces of the housing.

In the optical connector of the aspect of the invention, the housing may accommodate: an inserting optical fiber having an end portion fixed to an end surface of the ferrule at a joint portion and another end portion connected to the optical fiber; and a joint reinforced portion which reinforces the joint portion.

An aspect of the invention provides an optical connector which includes a housing; a regulating portion which serves as a protrusion protruding inward from the inner surface of the front end of the housing; and a ferrule which is secured to an optical fiber, and which is accommodated inside the housing so as to be movable in a butt-connection direction, wherein the ferrule comprises: a body portion with a joint end surface; and a locking convex portion formed at a rear side of the body portion so as to protrude from a side portion of the ferrule; the body portion comprises: a base portion being disposed at a front side of the locking convex portion so as to be adjacent to the locking convex portion, the base portion having a first thickness extending in a thickness direction that is perpendicular to the butt-connection direction, the locking convex portion having a second thickness, the first thickness of the base portion being smaller than the second thickness of the locking convex portion, a thinned portion, which is formed adjacently at a front side of the base portion and has a third thickness that is smaller than the first thickness, and a lens located on an extension line of the optical fiber; wherein if the ferrule moves forward in the butt-connection direction, the regulating portion and the base portion approach each other so that the regulating portion regulates the movement of the ferrule in the thickness direction; and wherein if the ferrule moves backward in the butt-connection direction, the regulating portion and the thinned portion separate from each other so that the movement of the ferrule in the thickness direction is not regulated by the regulating portion.

In the optical connector of the aspect of the invention, a side surface recess may be provided on a side surface of the body portion, the side surface extending along a front rear direction of the ferrule, the side surface recess being opened on the side surface; wherein an inserted optical fiber is fixed to the body portion so that one end portion of the inserted optical fiber is brought into contact with a surface of the side surface recess and so that another end portion of the inserted optical fiber is connected to the optical fiber.

An aspect of the invention provides an optical connector ferrule, which is secured to an optical fiber in a butt-connection direction, and which is insertable into a housing of an optical connector, the ferrule comprises a body portion with a joint end surface; and a locking convex portion formed at a rear side of the body portion so as to protrude from a side portion of the ferrule, the body portion comprising: a base portion having a side surface on which an opening communicating with an inner portion of the base portion is not provided, the side surface extending along a front-rear direction of the ferrule, the base portion being disposed at a front side of the locking convex portion so as to be adjacent to the locking convex portion, the base portion having a first thickness in a thickness direction that is perpendicular to the butt-connection direction, the locking convex portion having a second thickness, the first thickness of the base portion being smaller than the second thickness of the locking convex portion; and a thinned portion that is adjacently in front of the base portion and has a third thickness smaller than the first thickness of the base portion; wherein the ferrule is movable in the butt-connection direction; wherein if the ferrule moves forward in the butt-connection direction, the base portion moves toward an inner surface of the housing and movement of the ferrule in the thickness direction is regulated as the base portion approaches the housing; and wherein if the ferrule moves backward in the butt-connection direction, the movement of the ferrule in the thickness direction is released as the thinned portion separates from the housing.

An aspect of the invention provides an optical connector ferrule, which is secured to an optical fiber in a butt-connection direction, and which is insertable into a housing of an optical connector, the ferrule comprises a body portion with a joint end surface; and a locking convex portion formed at a rear side of the body portion so as to protrude from a side portion of the ferrule, the body portion comprising: a base portion being disposed at a front side of the locking convex portion so as to be adjacent to the locking convex portion, the base portion having a first thickness in a thickness direction that is perpendicular to the butt-connection direction, the locking convex portion having a second thickness, the first thickness of the base portion being smaller than the second thickness of the locking convex portion; a thinned portion that is adjacently in front of the base portion and has a third thickness smaller than the first thickness of the base portion; and a lens located on an extension line of the optical fiber; wherein the ferrule is movable in the butt-connection direction; wherein if the ferrule moves forward in the butt-connection direction, the base portion moves toward an inner surface of the housing and movement of the ferrule in the thickness direction is regulated as the base portion approaches the housing, and wherein if the ferrule moves backward in the butt-connection direction, the movement of the ferrule in the thickness direction is released as the thinned portion separates from the housing.

In the optical connector ferrule of the aspect of the invention, a side surface recess may be provided on a side surface of the body portion, the side surface extending along a front rear direction of the ferrule, the side surface recess being opened on the side surface, wherein an inserted optical fiber is fixed to the body portion so that one end portion of the inserted optical fiber is brought into contact with a surface of the side surface recess and so that another end portion of the inserted optical fiber is connected to the optical fiber.

According to an aspect of the invention, since the ferrule includes the base portion and the thinned portion having a thickness smaller than that of the base portion, the movement of the ferrule in the thickness direction at the base portion is regulated by the regulating portion of the housing in a non-connection state. So that the guide pin can be reliably fitted to the guide pin inserting hole of the counter optical connector during connection work.

Further, when the ferrule is retracted due to the butt-connection, the thinned portion reaches the position facing the regulating portion of the housing, so that the regulation of the movement in the thickness direction is released.

For this reason, even when the optical fiber is laterally pulled (side-pull), an excessive force is not exerted on the ferrule due to the housing, the breakage of the ferrule can be prevented, and the state of the connection with the counter optical connector is not adversely affected.

DETAILED DESCRIPTION OF THE PREFERRED EMBODIMENTS

Figure 1:
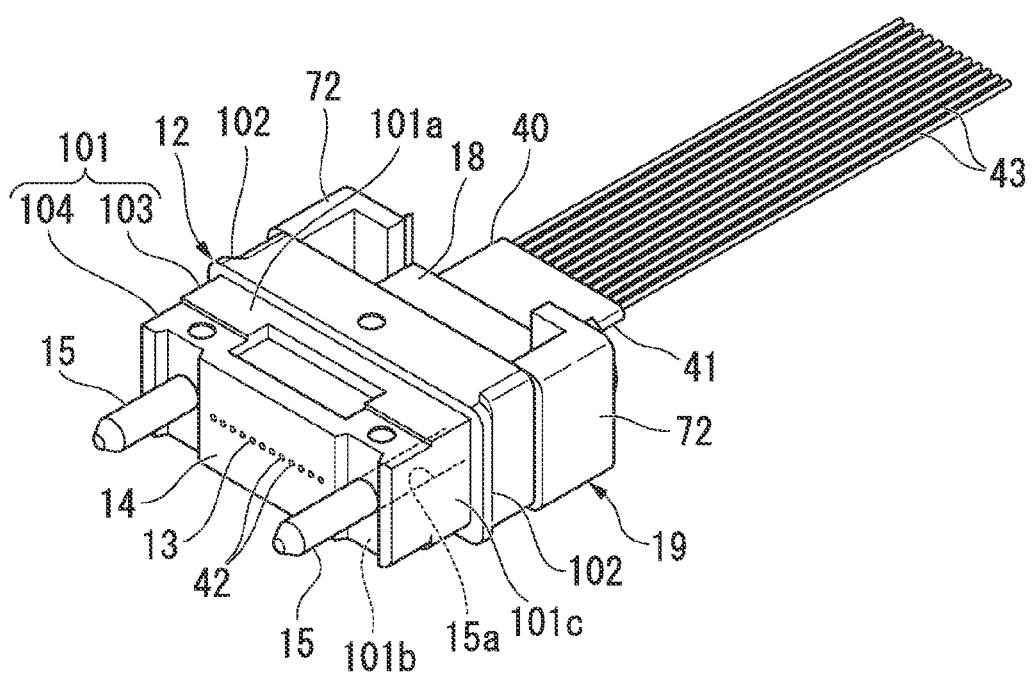
FIG. 1 is a perspective view showing a ferrule of an optical connector according to an embodiment of the invention.

Hereinafter, an exemplary embodiment of the invention will be described by referring to the drawings.

Figure 2A:
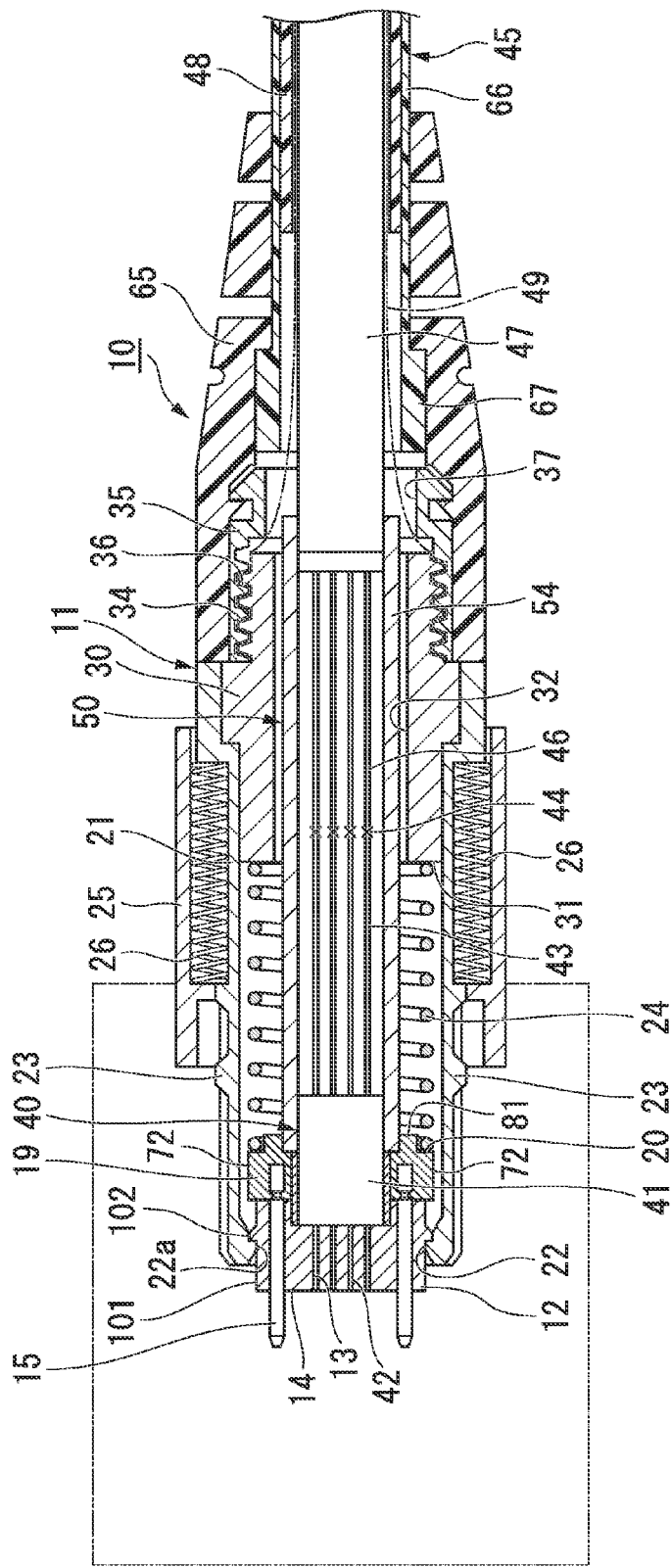
FIG. 2A is a cross-sectional view showing the optical connector and taken along a plane where multi-core optical fibers are arranged.
Figure 2B:
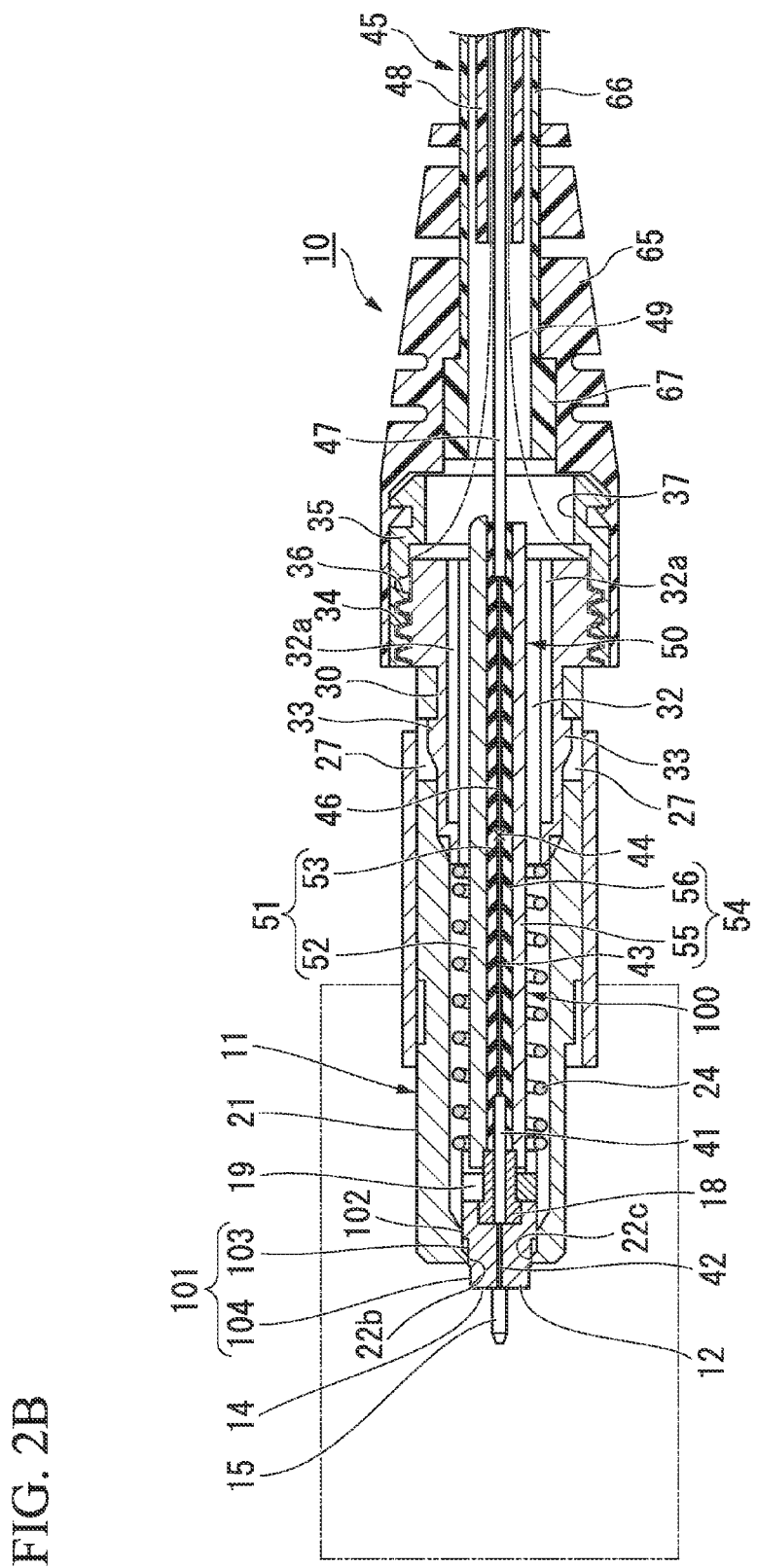
FIG. 2B is a cross-sectional view showing the optical connector of the previous figure and is a cross-sectional view taken along a plane which is perpendicular to the surface of the previous figure and is parallel to the longitudinal direction of the optical fiber.
Figure 3A:
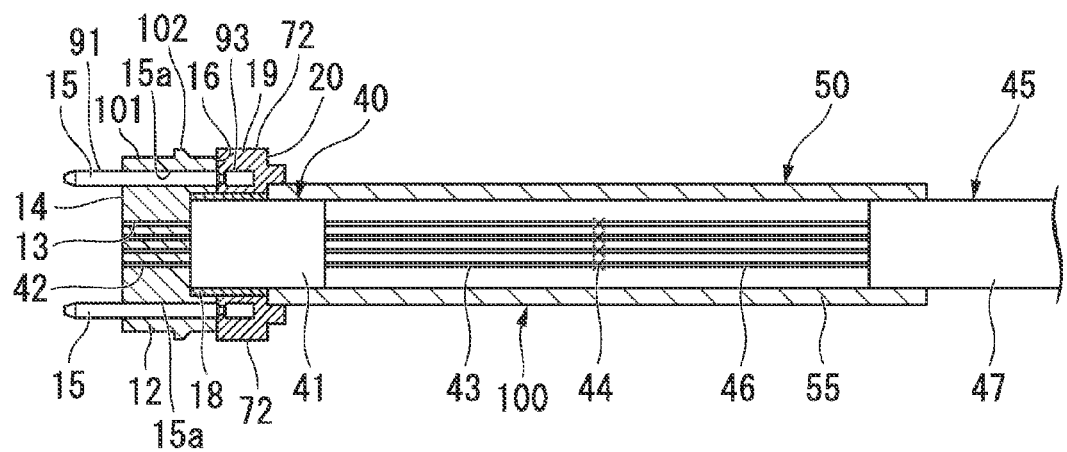
FIG. 3A is a cross-sectional view showing a ferrule and a joint reinforced portion of the optical connector shown in FIGS. 2A and 2B, and is a cross-sectional view taken along a plane where the multi-core optical fibers are arranged.
Figure 3B:
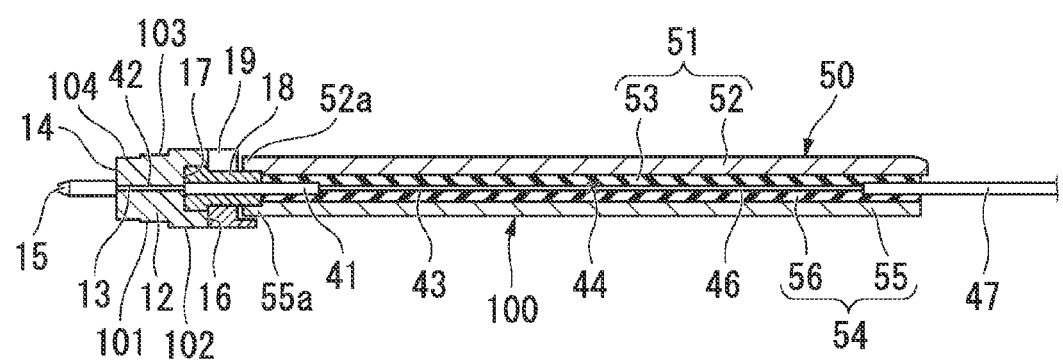
FIG. 3B is a cross-sectional view showing the ferrule and the joint reinforced portion of the optical connector shown in FIGS. 2A and 2B, and is a cross-sectional view taken along a plane which is perpendicular to the surface of the previous figure and is parallel to the longitudinal direction of the optical fiber.

FIGS. 2A and 2B show an optical connector 10 of the embodiment. FIG. 1 is a perspective view showing a ferrule 12 of the optical connector 10. FIGS. 3A and 3B are cross-sectional views showing the ferrule and a joint reinforced portion of the optical connector 10. Furthermore, FIGS. 2A and 2B may be simply referred to as "FIG. 2".

The optical connector 10 has a configuration in which the other end portion (second end portion) 43 of an inserting optical fiber 40 having one end portion (first end portion) 42 fixed to the ferrule 12 (the optical connector ferrule) is fusion spliced with a front end portion 46 of an external optical fiber 45, and a joint reinforced portion 50 formed by interposing a fusion splicing portion 44 between a pair of reinforced members 51 and 54 so as to reinforce the fusion splicing portion 44 is accommodated inside a housing or the like.

In the description below, in order to distinguish both directions along the longitudinal direction of the optical fiber (the left-right direction of FIG. 2), the direction in which a joint end surface 14 of the ferrule 12 faces (the left side of FIG. 2) may be referred to as a "front end direction" or a "front side", and the opposite direction (the right side of FIG. 2) may be referred to as a "rear end direction", a "base end direction", or a "rear side". The front-rear direction indicates the longitudinal direction in one end portion 42 of the inserting optical fiber 40, and also indicates the connection direction when the optical connector 10 is connected to the optical connector which serves as the counter connection part.

Figure 6A:
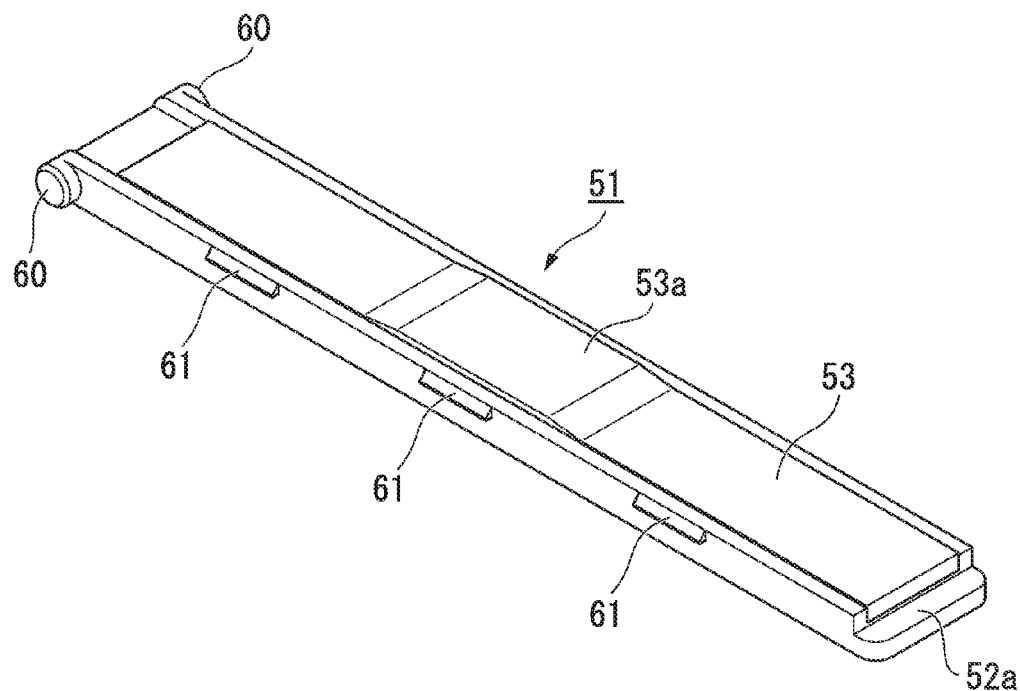
FIG. 6A is a perspective view showing a first reinforced member of the joint reinforced portion shown in FIGS. 3A and 3B.
Figure 6B:
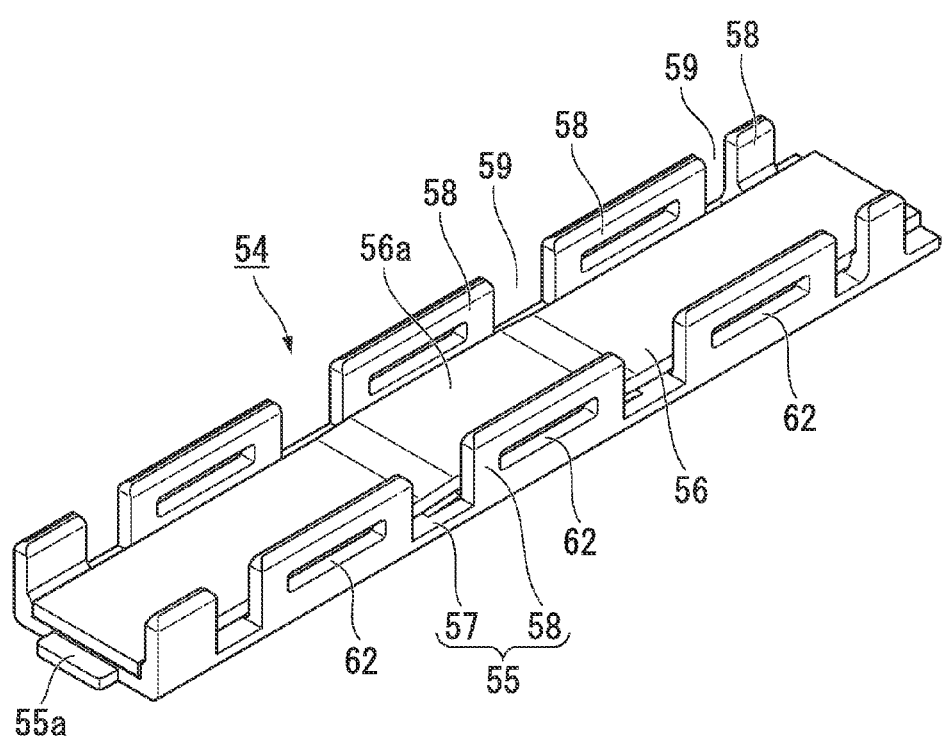
FIG. 6B is a perspective view showing a second reinforced member of the joint reinforced portion shown in FIGS. 3A and 3B.
Figure 11A:
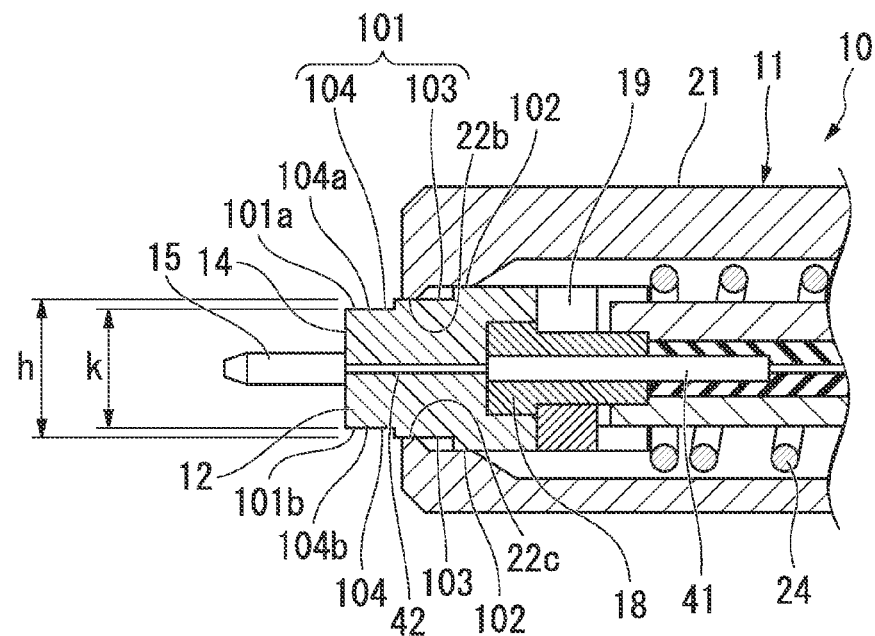
FIG. 11A is a cross-sectional view showing a main part of the optical connector in a non-connection state.
Figure 11B:
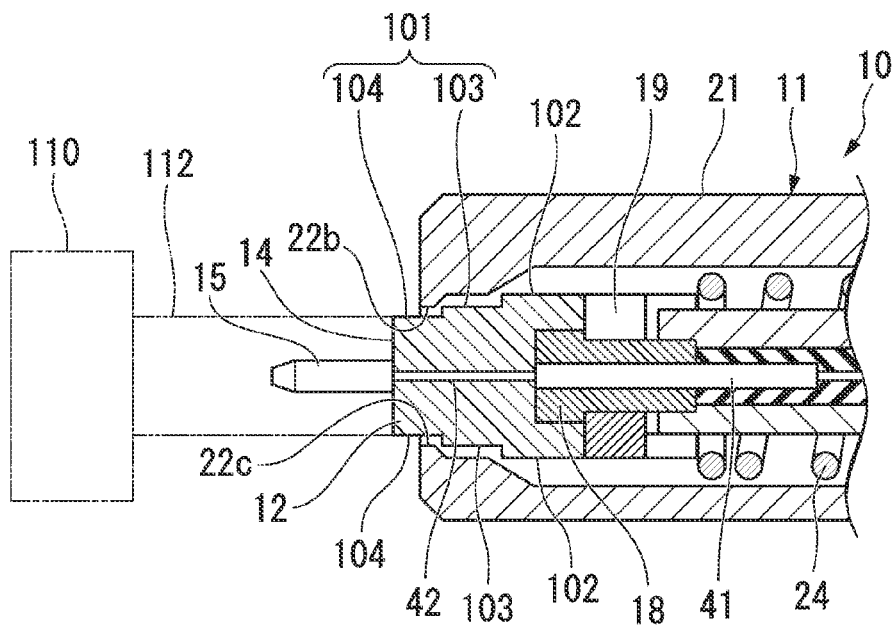
FIG. 11B is a cross-sectional view showing a main part of the optical connector in a butt-connection state.

Further, FIGS. 3A and 3B may be referred to as "FIG. 3", FIGS. 6A and 6B may be referred to as "FIG. 6", and FIGS. 11A and 11B may be referred to as "FIG. 11".

The external optical fiber 45 includes a light propagating body with an optical fiber such as an optical fiber cord or an optical fiber cable. In the case of the embodiment, the external optical fiber 45 is an optical fiber cord that includes a multi-core optical fiber core 47 which is formed by an optical fiber ribbon with a plurality of optical fibers (optical fiber strands, not shown) arranged in line in the lateral direction perpendicular to the longitudinal direction, a tubular jacket 48 which encloses the periphery of the multi-core optical fiber core 47, and a tension fiber 49 which is accommodated between the optical fiber core 47 and the jacket 48. At the front end portion 46 of the external optical fiber 45, a resin coating of the optical fiber core 47 and a resin coating of the optical fiber strand are removed, so that a plurality of bare optical fibers (the portions of a core and a clad) are separated from each other.

The number of bare optical fibers 46 (the number of cores) included in the optical fiber core 47 may be, for example, two cores, four cores, eight cores, twelve cores, or the like. Furthermore, only four cores are shown in FIGS. 2A, 3A, 4, 7, and 10 by simplifying the configuration of twelve cores. The optical fiber cord of the embodiment has a configuration in which one optical fiber ribbon is accommodated inside the jacket, but the invention is not particularly limited thereto. For example, the external optical fiber may adopt a configuration in which one jacket accommodates a plurality of single core optical fiber core, one jacket accommodates a plurality of optical fiber ribbons, or one jacket accommodates one or more optical fiber ribbons and one or more single core optical fiber cores.

The jacket 48 is formed of for example, a resin such as polyethylene and desirably has flexibility. A plurality of the tension fibers 49 extend along the longitudinal direction of the optical fiber, and function as tension bodies which receive a tensile force (a tension) exerted on the light propagating body. The fiber material used in each tension fiber 49 is not particularly limited as long as the material is able to obtain a demanded tensile strength, and for example, an aramid fiber, a glass fiber, a carbon fiber, and the like may be exemplified.

Furthermore, the tension body or the jacket is not essentially needed in the invention. For example, an optical fiber core or an optical fiber ribbon without the jacket may be used as the external optical fiber. Further, for example, various wires such as a metallic wire which is a steel wire or a fiber-reinforced plastic (FRP) wire may be used as the tension body depending on the structure of the optical fiber cable or the like. As the optical fiber cable, an optical drop cable, an optical indoor cable, and the like may be exemplified.

The inserting optical fiber 40 is an optical fiber of which one end portion (first end portion) 42 is fixed to the ferrule 12 and the other end portion (second end portion) 43 protrudes (extends) backward from the ferrule 12. In the case of the embodiment, the inserting optical fiber 40 is formed as a multi-core optical fiber core 41 formed of an optical fiber ribbon, where at one end portion 42 and the other end portion 43 of the optical fiber core wire 41, the resin coating of the optical fiber core 41 and the resin coating of the optical fiber strand are removed so that a plurality of bare optical fibers (the portions of the core and the clad) are separated from each other.

The front end of the inserting optical fiber 40 is exposed to the joint end surface 14, and is butt-connected to the optical fiber of the optical connector corresponding to the counter connection part.

Furthermore, the optical fiber used as the inserting optical fiber 40 is not limited to the multi-core optical fiber, and a configuration may be adopted in which one or a plurality of short single core optical fibers are inserted into one ferrule, a plurality of optical fiber ribbons are accommodated into one ferrule, or one or more optical fiber ribbons and one or more single core optical fiber cores are accommodated into one ferrule.

Figure 4:
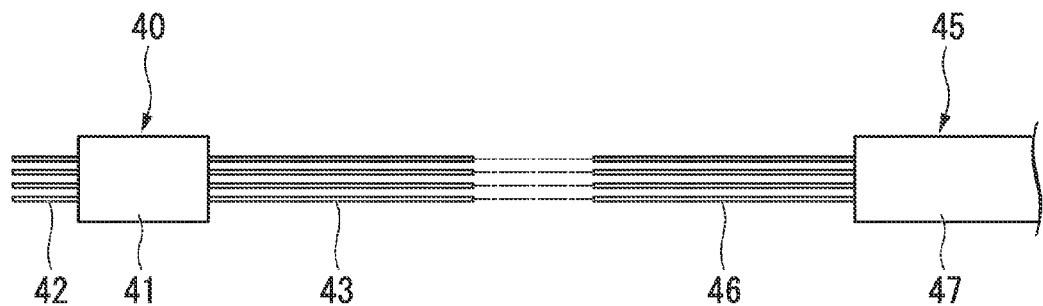
FIG. 4 is a plan view showing an external optical fiber and an inserting optical fiber of the optical connector.

As shown in FIG. 4, the other end portion 43 of the inserting optical fiber 40 corresponds one-to-one to the front end portion 46 of the external optical fiber 45, and both of them are fusion spliced. Then, as shown in FIG. 3, the fusion splicing portion 44 of the other end portion 43 of the inserting optical fiber 40 and the front end portion 46 of the external optical fiber 45 is reinforced by being interposed between the pair of reinforced members 51 and 54 at the joint reinforced portion 50.

The reinforced members 51 and 54 respectively include reinforced member bodies 52 and 55 which are formed as rigid members such as resin or metal, and adhesion layers 53 and 56 which are provided at the inner surface side corresponding to the side contacts to the other end portion 43 of the inserting optical fiber 40 and the front end portion 46 of the external optical fiber 45.

Figure 5:
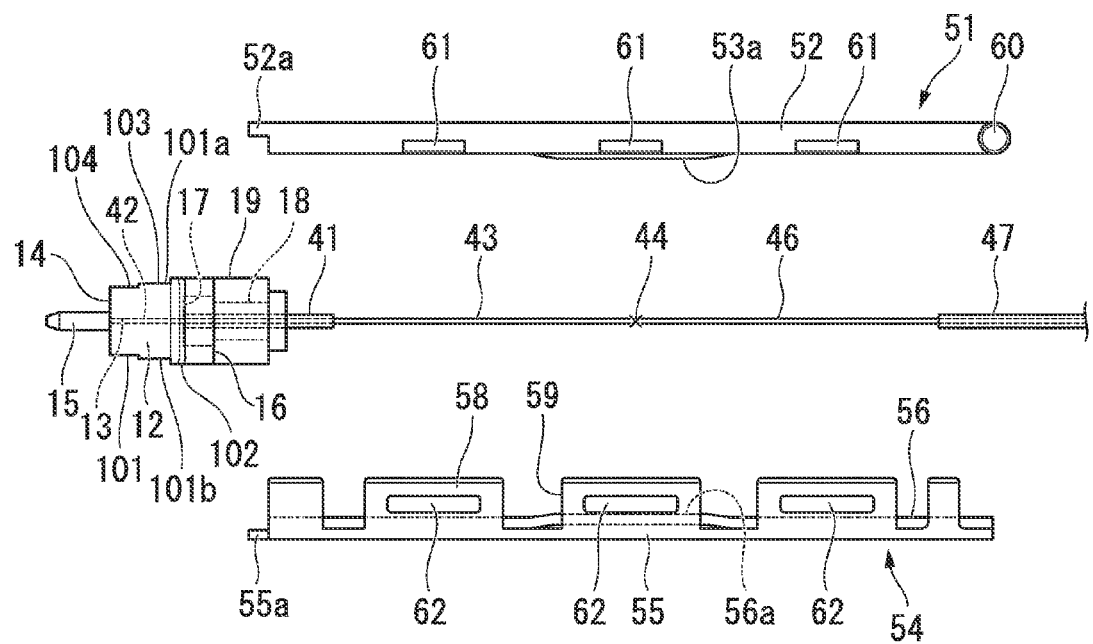
FIG. 5 is a side view showing the structure of the ferrule and the joint reinforced portion of the optical connector.
Figure 7:
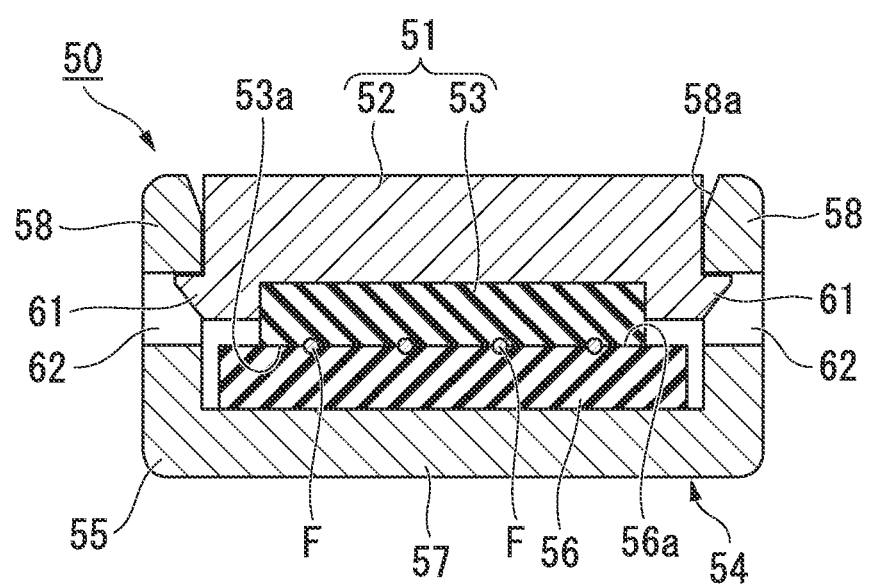
FIG. 7 is a cross-sectional view showing the joint reinforced portion.

As shown in FIGS. 5 to 7, the pair of reinforced members 51 and 54 respectively includes a convex portion 61 and a concave portion 62 which engage with each other at both sides of the width direction (the direction perpendicular to the plane of paper of FIG. 5) corresponding to the direction perpendicular to the longitudinal direction of the inserting optical fiber 40 and the external optical fiber 45. By engaging the convex portion (the engagement convex portion) 61 with the concave portion (the engagement concave portion) 62, the adhesion state between the adhesion layers 53 and 56 of the pair of reinforced members 51 and 54 is maintained.

The body 55 of the second reinforced member 54 includes a bottom wall portion 57 and side wall portions 58 and 58 provided at both sides in the width direction, and the engagement concave portion 62 is a penetration hole formed at the side wall portion 58.

The side wall portion 58 of the second reinforced member 54 is divided into a plurality of portions (tongue-shaped portions) with notched portions 59 interposed therebetween, and one or less engagement concave portions 62 is formed at one piece of the side wall portion 58.

In order to easily open and close the reinforced members 51 and 54, a slope 58a is formed at the inner surface of the side wall portion 58.

The adhesion layers 53 and 56 respectively include bulged portions 53a and 56a of which the surface heights are bulged near the fusion splicing portion 44, so that a further high pressing force can be maintained between the bulged portions 53a and 56a. Further, both sides of the bulged portions 53a and 56a (both sides of the bare optical fibers 43 and 46 in the longitudinal direction) are provided with alleviation portions 53b and 56b of which the surface heights are lower than that of the bulged portions 53a and 56a, so that the pressing force is alleviated.

As shown in FIG. 7, the adhesion layers 53 and 56 are depressed at a position contacts to the inserting optical fiber and the external optical fiber (which are generally shown as the optical fiber F in FIG. 7) so as to come into close contact with the outer peripheral surface of the optical fiber F in the vicinity of the fusion splicing portion 44.

As shown in FIGS. 1 to 3, the ferrule 12 includes a front end surface (a joint end surface) 14 which is butt-connected to a ferrule (not shown) of another optical connector (an optical connector corresponding to a counter connection part), a rear end surface 16 which is an end surface opposite to the joint end surface 14, an optical fiber inserting hole (a microscopic hole) 13 which is opened to the joint end surface 14, and a boot accommodating hole 17 which is opened to the rear end surface 16. The ferrule 12 can be manufactured as, for example, a plastic single molding product. The joint end surface 14 of the ferrule 12 may be a perpendicular surface which is perpendicular to the center axis of the optical fiber inserting hole 13 (which approximately matches the optical axis of the optical fiber 42) or a slope which is inclined in a predetermined direction corresponding to the ferrule of another optical connector.

The optical fiber inserting hole 13 is formed as many as the number of the optical fibers at one end portion 42 of the inserting optical fiber 40. As a method of fixing the bare optical fiber corresponding to one end portion 42 of the inserting optical fiber 40 to the ferrule 12, for example, a method of injecting adhesive into the optical fiber inserting hole 13 is simple. Each of the optical fiber inserting holes 13 is connected to the boot accommodating hole 17. A ferrule boot 18 is attached to the periphery of the optical fiber core 41, and is accommodated in the boot accommodating hole 17. It is desirable that the ferrule boot 18 be formed of, for example, a material such as rubber or elastomer with flexibility. However, the ferrule boot 18 may be formed of a material such as resin or metal with low flexibility.

The number of the optical fiber inserting holes 13 provided in the ferrule 12 (the number of cores) may be, for example, two cores, four cores, eight cores, twelve cores, and the like, and the optical fiber inserting holes 13 are provided in accordance with the number of cores of the optical fiber core 47. Furthermore, in the optical connector 10 of the embodiment, a single core ferrule may be used as the ferrule 12.

Regarding the arrangement of the optical fiber inserting holes 13 at the joint end surface 14 of the multi-core ferrule 12, it is desirable that the optical fiber inserting holes 13 be arranged in line in accordance with the arrangement of the optical fibers interposed between the reinforced members 51 and 54. Furthermore, the invention is not limited to a configuration in which the arrangement of the optical fibers in the ferrule 12 is the same as the arrangement of the optical fibers in the joint reinforced portion 50, but the arrangement of the optical fibers separated for each core between the ferrule 12 and the joint reinforced portion 50 may be changed.

As shown in FIGS. 1 and 11A, the ferrule 12 includes a body portion 101 with the joint end surface 14 and a locking convex portion 102 formed at the rear side of the body portion 101 so as to protrude outward.

The ferrule 12 is formed in a shape in which the dimension in the arrangement direction of the optical fiber inserting holes 13 (the up-down direction of FIG. 2A) is larger than the dimension in the direction perpendicular thereto (the up-down direction of FIG. 2B), that is, a flat shape. Hereinafter, the arrangement direction of the optical fiber inserting holes 13 is set as the width direction, and the direction perpendicular thereto is set as the thickness direction.

The joint end surface 14 of the ferrule 12 is substantially formed in a rectangular shape of which the side along the width direction is set as the long side and the side along the thickness direction is set as the short side.

In FIGS. 2B, 3B, 11B, and the like, the left direction indicates a direction in which the ferrule 12 is butt-connected to the counter connection optical connector 110 (the counter optical connector 110), and the up-down direction perpendicular thereto indicates the thickness direction of the ferrule 12.

As shown in FIG. 2, the ferrule 12 is movable in the front-rear direction (the butt-connection direction) while being biased forward by a ferrule spring 24.

For this reason, as shown in FIG. 11A, the ferrule 12 is comparatively positioned at a front side while the optical connector 10 is not connected to the counter connection optical connector 110 (the counter optical connector 110) (in a non-connection state). However, as shown in FIG. 11B, when the optical connector 10 is butt-connected to a ferrule 112 of the counter optical connector 110, the ferrule 12 is pressed by the ferrule 112 so as to move backward.

Hereinafter, the position of the ferrule 12 shown in FIG. 11A indicates an "advanced position", and the position of the ferrule 12 retracted due to the butt-connection as shown in FIG. 11B indicates a "retracted position".

As shown in FIG. 1, the locking convex portion 102 is formed from both surfaces of the body portion 101 in the thickness direction (an upper surface 101a and a lower surface 101b) and both side surfaces 101c and 101c.

As shown in FIG. 2A, the forward movement of the locking convex portion 102 is regulated by a locking protrusion 22a formed in the inner surface of the plug frame 21, whereby the forward movement of the ferrule 12 is regulated and the separation of the ferrule 12 is prevented.

As shown in FIG. 2B and FIG. 11A, the inner surfaces (the ceiling surface and the bottom surface) of the plug frame 21 (housing 11) are respectively provided with regulating portions 22b and 22c which regulate the movement of the ferrule 12 in the thickness direction.

The shape and the formation position of the regulating portions 22b and 22c are not limited as long as the regulating portion can regulate the movement of the ferrule 12 in the thickness direction in the non-connection state. However, it is desirable that the regulating portions be formed as a protrusion protruding inward from the inner surface of the front end of the plug frame 21.

Furthermore, the regulating portion may be formed only at one of the inner surfaces (the ceiling surface and the bottom surface) of the plug frame 21 in the thickness direction. However, it is desirable that the regulating portions be formed at both inner surfaces as shown in the drawings in that the movement toward both sides in the up-down direction is regulated.

As shown in FIG. 1, the body portion 101 includes a base portion 103 and a thinned portion 104 which is provided at the front side of the base portion 103 so as to be thinner than the thickness of the base portion 103.

The base portion 103 is formed so as to have a substantially rectangular shape, and is formed so as to have substantially the same thickness in the front-rear direction.

The thickness of the base portion 103 is set so that the movement of the ferrule 12 in the thickness direction is regulated by the regulating portions 22b and 22c when the ferrule 12 is positioned at the advanced position.

That is, as shown in FIG. 11A, the thickness h of the base portion 103 is set so that the front ends (the protruding ends) of the regulating portions 22b and 22c approach the outer surfaces (the upper surface and the lower surface) of the base portion 103 facing the front ends, and the movement of the ferrule 12 in the up-down direction hardly occurs or the movement amount is extremely small even when the ferrule 12 moves in the up-down direction.

Furthermore, in the example shown in the drawing, the regulating portions 22b and 22c are not used to prohibit the movement of the ferrule 12 in the front-rear direction.

As shown in FIGS. 1 and 11A, the thinned portion 104 is formed so as to have a substantially cross-sectional rectangular shape, and is formed so as to have substantially the same thickness in the front-rear direction.

As shown in FIG. 11A, the thinned portion 104 is formed by a thinned concave portion 104a which is formed at the front end side portion of the body portion 101.

It is desirable that the thinned concave portion 104a be formed at both surfaces of the body portion 101 in the thickness direction, that is, the upper surface 101a and the lower surface 101b of the body portion 101. With such a configuration, when the ferrule 12 is retracted due to the butt-connection, the ferrule 12 is movable in both directions (the up direction and the down direction) in the thickness direction, whereby the position adjusting function can improve.

Furthermore, the thinned concave portion 104a may be formed only at one surface of the body portion 101 in the thickness direction.

The thickness of the thinned portion 104 is set so that the regulation of the movement using the regulating portions 22b and 22c is released when the ferrule 12 is positioned at a position retracted (the retracted position) due to the butt-connection with the counter optical connector 110.

Specifically, as shown in FIG. 11B, the thickness k of the thinned portion 104 is set so that the movement of the ferrule 12 in the up-down direction is permitted due to a sufficient gap between the front ends (the protruding ends) of the regulating portions 22b and 22c and the outer surfaces (the upper surface and the lower surface) of the thinned portion 104 facing the front ends at the retracted position.

As shown in FIG. 3B, the ferrule boot 18 is attached to the ferrule 12 so as to coat the periphery of the portion of the inserting optical fiber 40 protruding from the ferrule 12. The pair of reinforced members 51 and 54 (specifically, the bodies 52 and 55) include protrusions which are provided at an end of the reinforced member near the ferrule 12 and serve as boot gripping portions 52a and 55a, and grips the ferrule boot 18 between the boot gripping portions 52a and 55a.

Accordingly, both ends of the ferrule boot 18 are properly held between the ferrule 12 and the pair of reinforced members 51 and 54, so that the bending or the damage of the inserting optical fiber 40 can be more reliably prevented.

Further, since the slight bending of the ferrule boot 18 is permitted, even when a force in the bending direction is applied to the joint reinforced portion 50 due to the side-pull, the damage of the ferrule 12 and the joint reinforced portion 50 can be prevented.

Since the joint reinforced portion 50 is connected to the rear side of the ferrule 12 through the ferrule boot 18, these are generally referred to as a "joint reinforced portion attached ferrule 100".

The ferrule 12 is provided with guide pins 15 of which the front ends protrude forward from the joint end surface 14 so as to position the ferrule with respect to the counter connection optical connector.

The guide pins 15 are provided so as to be inserted through guide pin inserting holes 15a penetrating between the joint end surface 14 and the rear end surface 16. When the guide pins 15 are inserted into guide pin inserting holes (not shown) provided in a ferrule of another optical connector, the positional deviation in the direction along the surface of the joint end surface 14 (the up-down direction of FIG. 3A, the up-down direction of FIG. 3B, or the inclined direction obtained by the combination thereof) is suppressed, and the accurate positioning operation between the optical connector 10 and the counter connection optical connector can be performed.

The type with which the positioning operation with respect to the counter connection optical connector is performed using the guide pins 15 is called a guide pin positioning type.

As shown in FIG. 3A, in the example shown in the drawing, the guide pin inserting holes 15a and 15a are used to allow the guide pins 15 to be freely inserted thereinto and extracted therefrom, where the guide pin inserting holes are provided along the front-rear direction, and are respectively provided at one side and the other side of the optical fiber inserting hole 13, through which the inserting optical fiber 40 is inserted, namely the optical fiber inserting hole 13 are interposed between the guide pin inserting holes 15a and 15a.

The guide pins 15 are provided so as to be respectively inserted through the pair of guide pin inserting holes 15a.

Figure 8:
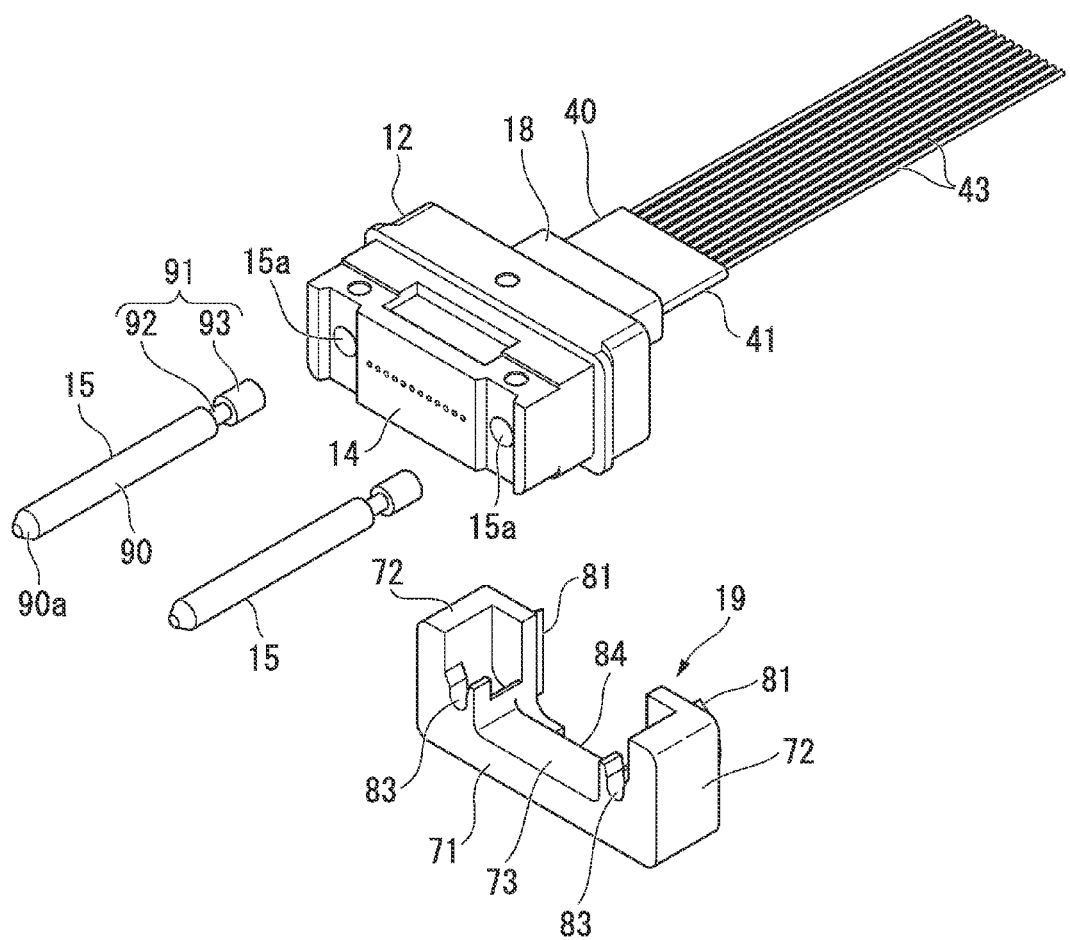
FIG. 8 is an exploded perspective view of a ferrule and a pin clamp.

As shown in FIGS. 1 and 8, the guide pin 15 is substantially formed in a cylindrical shape, and includes a body portion 90 which has a taper-shaped front end portion 90a, and a base end portion 91 which is formed at the rear end side of the body portion 90.

The base end portion 91 includes a neck portion 92 which extends backward from the rear end of the body portion 90 and a head portion 93 which is provided at the rear end of the neck portion 92. The neck portion 92 is formed so as to be smaller in diameter than the head portion 93, and the body portion 90 is formed so as to be larger in diameter than the neck portion 92.

As shown in FIGS. 1 to 3, the body portion 90 is inserted through the guide pin inserting hole 15a, and protrudes forward from the joint end surface 14.

Furthermore, the optical connector 10 shown in FIGS. 1 to 3 may be formed as a type (a male type) with the guide pin 15, but as described below, the optical connector may be formed as a type (a female type) without the guide pin 15.

As shown in FIGS. 1 to 3, the rear end surface 16 of the ferrule 12 is provided with a pin clamp 19. The position of the pin clamp 19 in the front-rear direction is present at the front side of the fusion splicing portion 44.

As shown in FIG. 8, the pin clamp 19 is used to support the guide pin 15, and is attachably and detachably attached to the base end portion 91 of the guide pin 15.

The pin clamp 19 of the example shown in the drawing is formed of a synthetic resin material or the like, and is formed in a substantial U-shape which has a bottom portion 71 and side wall portions 72 and 72 provided at both side portions of the bottom portion 71.

The side wall portions 72 and 72 are formed so as to be separated from each other with an insertion space 73 interposed therebetween, and the inserting optical fiber 40 is inserted through the insertion space 73 (see FIGS. 2 and 3). The insertion space 73 may be formed so that the ferrule boot 18 is fittable thereinto.

The side wall portions 72 and 72 are respectively provided with fitting concave portions 83 and 83. The base end portion 91 (the neck portion 92) of the guide pin 15 may be fitted to the fitting concave portion 83 from a direction substantially perpendicular to the guide pin inserting hole 15a.

Figure 9:
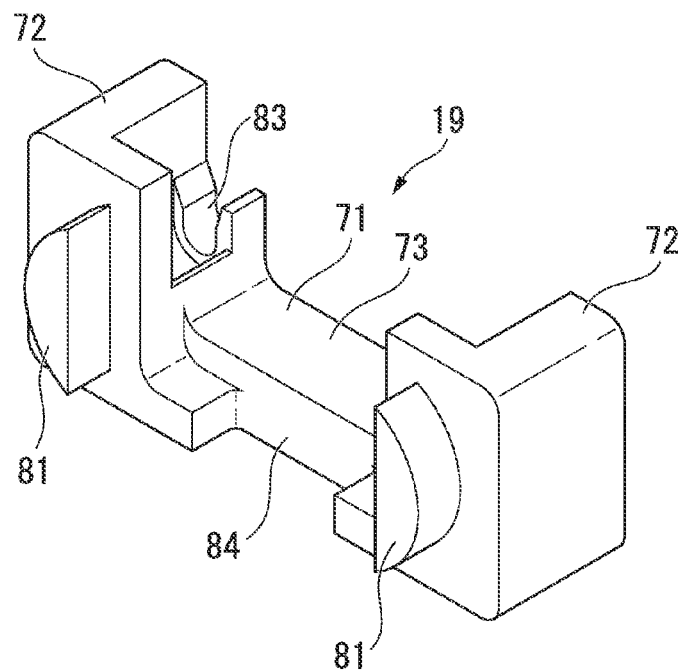
FIG. 9 is a perspective view showing the pin clamp.
Figure 10:
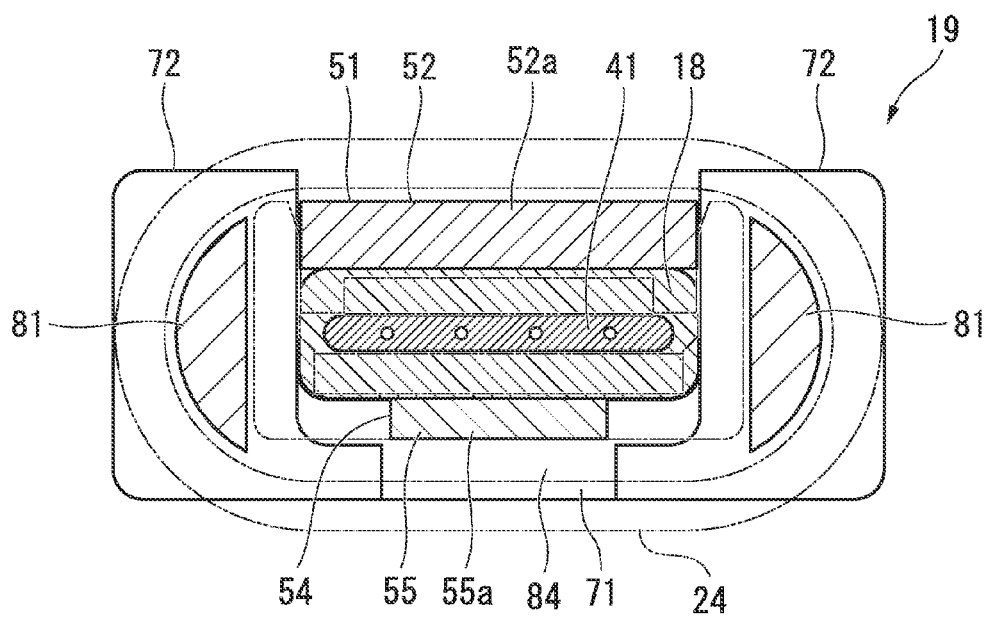
FIG. 10 is a cross-sectional view showing the joint reinforced portion and the pin clamp.

As shown in FIGS. 8 to 10, a positioning convex portion 81 protruded backward is provided at the rear surface of the side wall portion 72.

The positioning convex portion 81 is used to prevent the positional deviation of the ferrule spring 24, and is inserted into the front end portion of the ferrule spring 24 (see FIG. 2).

The rear surface of the side wall portion 72 becomes a spring seat 20 which receives a biasing force (a pressing force caused by elasticity) from the ferrule spring 24. For this reason, even when the ferrule 12 is not provided with the guide pin 15, the pin clamp 19 is attached to the ferrule 12. The pin clamp 19 can be fitted and fixed to the ferrule 12 through, for example, a concave or a convex (not shown) or the like.

As shown in FIGS. 9 and 10, a notch 84 is formed at the center portion of the rear edge of the bottom portion 71 so as to have a size which permits the upward and downward movement of the boot gripping portion 55a formed at the body 55 of the reinforced member 54.

The optical connector 10 described in the embodiment is a multi-core optical connector, and may have the same structure as that of the MPO type optical connector (an F13-type multi-core optical fiber connector stipulated in JIS C 5982; MPO: Multi-fiber Push On). The optical connector applicable to the invention is not particularly limited regardless of whether it is for a single core or multiple cores.

The housing 11 of the optical connector 10 includes the sleeve-shaped (cylindrical) plug frame 21 and a sleeve-shaped (cylindrical) stop ring 30 which is attached to the rear end side of the plug frame 21.

The ferrule 12 is inserted through the front end side opening 22 of the plug frame 21.

An engagement claw 33, which can engage with an engagement window 27 formed at the side wall portion of the plug frame 21, is formed at the outer surface of the stop ring 30 so as to integrate the plug frame 21 and the stop ring 30 with each other.

The ferrule spring 24 (the biasing member) is used to bias the ferrule 12 forward through the pin clamp 19, and is disposed around the joint reinforced portion 50 so as to allow the front end side of the spring 24 to come into contact with the spring seat 20 at the rear end side of the pin clamp 19 and allow the rear end side of the spring 24 to come into contact with the spring seat 31 at the front end side of the stop ring 30.

When the joint end surface 14 of the ferrule 12 is connected to a ferrule of another optical connector, the ferrule 12 is pressed backward while being guided inside the opening 22, so that the ferrule spring 24 contracts. Then, an appropriate pressing force is exerted between the joint end surface 14 of the ferrule 12 and the joint end surface of the ferrule of another optical connector, so that the joint end surfaces come into close contact with each other. Further, when the connection between the ferrule 12 and the ferrule of another optical connector is released, the ferrule spring 24 expands, so that the ferrule 12 moves inside the opening 22 and returns to the original position.

Engagement portions 23 are provided at both sides of the plug frame 21 in the width direction (both upper and lower sides of FIG. 2A) so as to allow an MPO type connector plug to engage with an MPO type connector adapter or an engagement claw (not shown) of a receptacle. Further, the outer periphery of the plug frame 21 is provided with a coupling 25, and a pair of coupling springs 26 and 26 is accommodated between the outer peripheral surface of the plug frame 21 and the inner peripheral surface of the coupling 25. Accordingly, the coupling 25 can move forward and backward relative to the plug frame 21 in accordance with the expanding or the contracting of the coupling springs 26 and 26. The engagement portion 23 or the coupling 25 corresponds to the MPO type optical connector plug, and has the same configuration as that stipulated in the above-described JIS or the like.

Furthermore, in the case where the invention is applied to a different type of optical connector, a configuration necessary for the connection of the optical connector (the connector connection) is appropriately provided at the ferrule, the housing or the like.

A penetration hole 32 is formed inside the stop ring 30, in which the penetration hole 32 penetrate in the front-rear direction (the left-right direction of FIG. 2) along the longitudinal direction of the optical fiber. The cross-sectional shape of the penetration hole 32 (the cross-sectional shape in the plane perpendicular to the longitudinal direction of the optical fiber) at least includes the cross-sectional shape of the joint reinforced portion 50. Accordingly, when the stop ring 30 is press-inserted into the plug frame 21 from the rear side of the joint reinforced portion 50 while the ferrule 12 is inserted into the opening 22 of the plug frame 21, the stop ring 30 does not interfere with the joint reinforced portion 50 (the press-inserting is not disturbed). When the stop ring 30 is press-inserted into the plug frame 21 from the rear side of the joint reinforced portion 50, the engagement claw 33 is pulled into the joint reinforced portion 50 immediately before the engagement claw 33 reaches the engagement window 27. For this reason, a groove 32a is provided in the inner surface of the penetration hole 32 at the rear surface side of the engagement claw 33, so that the interference between the rear surface of the engagement claw 33 and the joint reinforced portion 50 is prevented.

A male screw portion 34 is formed at the outer peripheral surface of the rear end of the stop ring 30. The male screw portion 34 is fastened to the female screw portion 36 formed at the inner peripheral surface of the screw ring 35. The front end portion of the tension fiber 49 of the external optical fiber 45 can be interposed and fixed between the male screw portion 34 and the female screw portion 36. The screw ring 35 includes an opening 37 at the rear end side thereof, and the portions of the tension fiber 49 of the external optical fiber 45 and the optical fiber core wire 47 are inserted through the opening 37. It is desirable that the cross-sectional shape of the opening 37 (the cross-sectional shape in a plane perpendicular to the longitudinal direction of the optical fiber) have a certain degree of opening dimension so as to prevent the tension fiber 49 and the joint reinforced portion 50 from coming into contact with each other.

The outer peripheral surface of the screw ring 35 is provided with an external optical fiber boot 65 which is used to protect the external optical fiber 45. The external optical fiber boot 65 is generally formed of a material with flexibility such as rubber or elastomer or the like. In the case of the embodiment, a protection tube 66 is attached to the periphery of the jacket 48 of the external optical fiber 45, and an annular fitting portion 67 of which the diameter increases at the front end side of the tube 66 is fitted into the external optical fiber boot 65.

The sequence of assembling the housing or the like is not particularly limited, but for example, the following sequence may be exemplified.

As an advance preparation performed before fusion splice, the external optical fiber 45 is made to pass through the ferrule spring 24, the stop ring 30, the screw ring 35, the external optical fiber boot 65, and the protection tube 66. It is desirable that these components be disposed at the rear side (the right side of FIG. 2) so as not to disturb the fusion splice.

The bare optical fibers 43 and 46 are fusion spliced, and the fusion splicing portion 44 is reinforced by being interposed between the pair of reinforced members 51 and 54 at the joint reinforced portion 50.

As shown in FIG. 8, since the fitting concave portion 83 of the pin clamp 19 is formed downward, the neck portion 92 of the guide pin 15 can be inserted or extracted in the up-down direction.

For this reason, when the pin clamp 19 is moved laterally (from the downside to the upside in FIG. 8) so that the base end portion 91 of the guide pin 15 is fitted to the fitting concave portion 83, the pin clamp 19 can be installed at the rear end side of the ferrule 12.

After the ferrule 12 is disposed inside the opening 22 of the plug frame 21 by attaching the plug frame 21 from the front side of the ferrule 12 (the left side of FIG. 2), the stop ring 30 is press-inserted into the plug frame 21 so as to allow the engagement claw 33 to engage with the engagement window 27 and accommodate the ferrule spring 24 together with the ferrule 12 and the joint reinforced portion 50. The coupling 25 may be attached onto the plug frame 21 in advance or may be attached thereto after the attachment of the stop ring 30.

The front end portion of the tension fiber 49 is disposed on the male screw portion 34 of the stop ring 30, and the female screw portion 36 of the screw ring 35 is fastened to the male screw portion 34 so as to fix the front end portion of the tension fiber 49. When the front end portion of the tension fiber 49 extends to the outer periphery of the plug frame 21, the front end portion is cut if necessary. Furthermore, the boot 65 is attached onto the stop ring 30. According to the above-described sequence, the optical connector 10 shown in FIG. 2 can be assembled.

Furthermore, when the external optical fiber does not include the tension fiber, the housing may be integrated by fastening the female screw portion 36 of the screw ring 35 to the male screw portion 34 of the stop ring 30 without interposing the tension fiber.

The optical connector 10 shown in FIG. 1 is formed as a type (a male type) with the guide pin 15. However, a type (a female type) may be adopted by removing the pin clamp 19 and extracting the guide pin 15 toward the front end.

Next, the operation of the optical connector 10 will be described by referring to FIGS. 11 and 12.

As shown in FIG. 11A, in the optical connector 10 in the non-connection state, the ferrule 12 is present at the front position. In this state, the regulating portions 22b and 22c of the plug frame 21 (the housing 11) are present at a position facing the base portion 103.

Since the base portion 103 is formed so that the movement thereof in the thickness direction is regulated by the regulating portions 22b and 22c, at the time of connecting the optical connector 10 to the counter optical connector, the positional deviation of the ferrule 12 in the up-down direction does not occur, the guide pin 15 can be reliably fitted to a guide pin inserting hole (not shown) of the counter optical connector, and the connection work is not disturbed.

As shown in FIG. 11B, in the state where the optical connector 10 is butt-connected to the ferrule 112 of the counter optical connector 110, the ferrule 12 moves backward while being pressed by the ferrule 112, and the thinned portion 104 reaches a position facing the regulating portions 22b and 22c.

Since the thickness of the thinned portion 104 is smaller than that of the base portion 103, the distance from the regulating portions 22b and 22b increases, the regulation of the movement using the regulating portions 22b and 22c in the thickness direction is released, so that the ferrule 12 is permitted to slightly move up and down.

Figure 12:
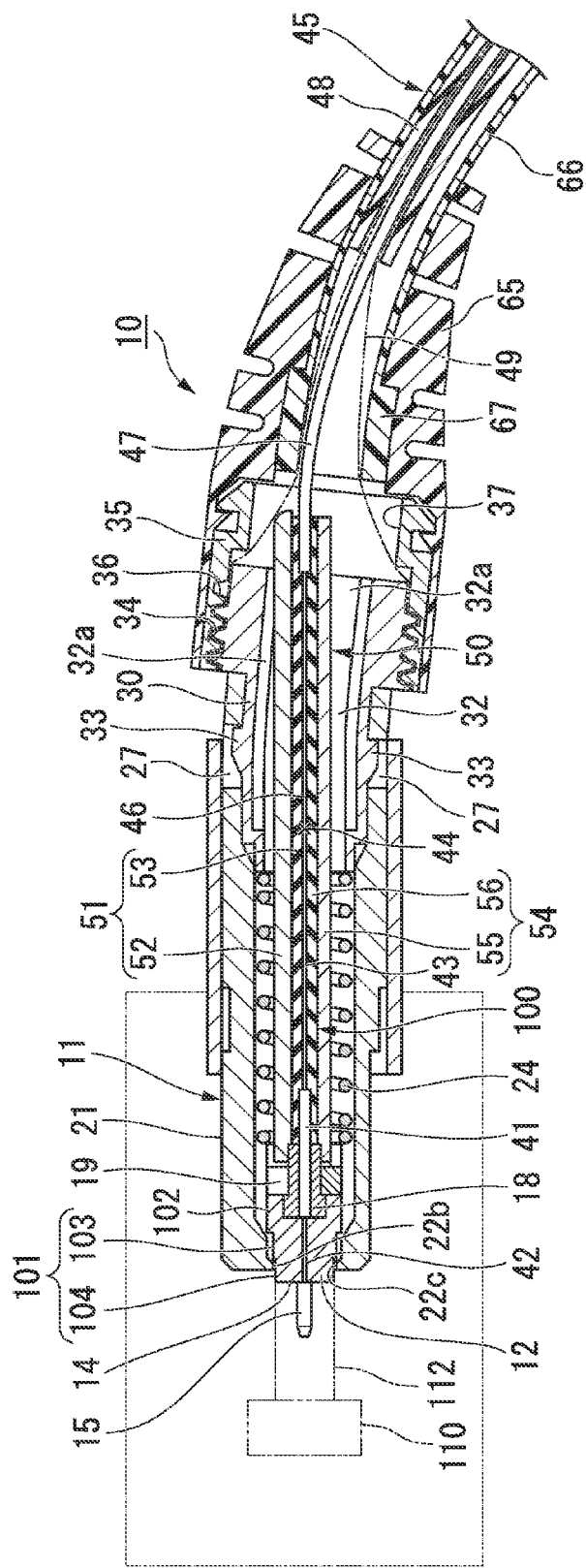
FIG. 12 is an explanation view showing a state of the optical connector when the optical fiber is pulled laterally (side-pull occurs).

As shown in FIG. 12, when the external optical fiber 45 is pulled laterally (a so-called side-pull; a direction intersecting the direction of the optical fiber) in the state where the optical connector 10 is butt-connected to the ferrule 112 of the counter optical connector 110, the force in such a direction may be exerted on the joint reinforced portion attached ferrule 100.

In the example shown in the drawing, when a force is exerted on the external optical fiber 45 downward (in the thickness direction), there is a concern in that the downward force may be exerted on the rear end portion of the joint reinforced portion attached ferrule 100.

In the optical connector 10, since the slight upward and downward movement of the ferrule 12 is permitted in the butt-connection state, an excessive force is not exerted on the ferrule 12 due to the housing 11 even when the joint reinforced portion attached ferrule 100 is inclined downward.

Since the excessive force is not exerted on the ferrule 12, the damage of the ferrule 12 can be prevented and the state of the connection with the counter optical connector 110 is not adversely affected.

The optical connector 10 shown in FIG. 2 uses the inserting optical fiber 40 fixed to the ferrule 12, but the invention is not limited thereto. The external optical fiber may be directly introduced into the ferrule.

Figure 13A:
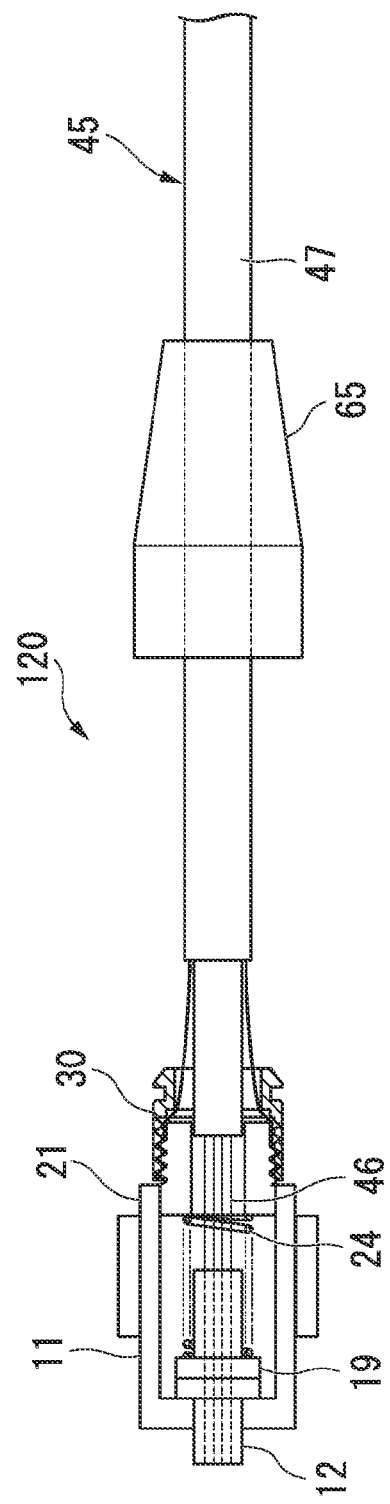
FIG. 13A is a cross-sectional view schematically showing another example of the optical connector, and is a cross-sectional view taken along a plane where the multi-core optical fibers are arranged.
Figure 13B:
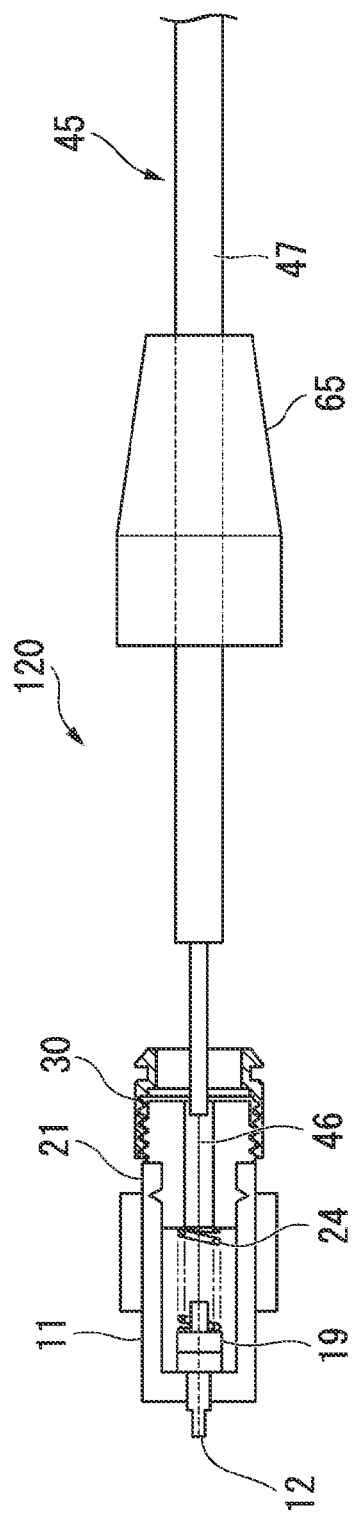
FIG. 13B is a cross-sectional view schematically showing the optical connector of the previous figure, and is a cross-sectional view taken along a plane which is perpendicular to the surface of the previous figure and is parallel to the longitudinal direction of the optical fiber.

FIGS. 13A and 13B schematically illustrate the optical connector with such a structure, where the optical fiber 46 drawn from the external optical fiber 45 is directly introduced into the ferrule 12. Furthermore, the description of the configuration which has been already mentioned will not be repeated by giving the same reference numerals thereto.

Further, the optical connector 10 shown in FIG. 2 has a configuration in which the fusion splicing portion 44 of the inserting optical fiber 40 and the external optical fiber 45 is interposed between the pair of reinforced members 51 and 54 at the joint reinforced portion 50, but the invention is not limited thereto. The fusion splicing portion 44 may be reinforced by the known reinforced sleeve.

Further, in the connection between the inserting optical fiber 40 and the external optical fiber 45, another connection type, for example, a type (a mechanical splice type) in which the optical fibers are butt-connected between the pair of elements may be adopted.

As shown in FIG. 11 and the like, in the optical connector 10, the locking convex portion 102 is provided near the rear end of the ferrule 12, but the shape of the locking convex portion is not limited thereto.

Figure 14:
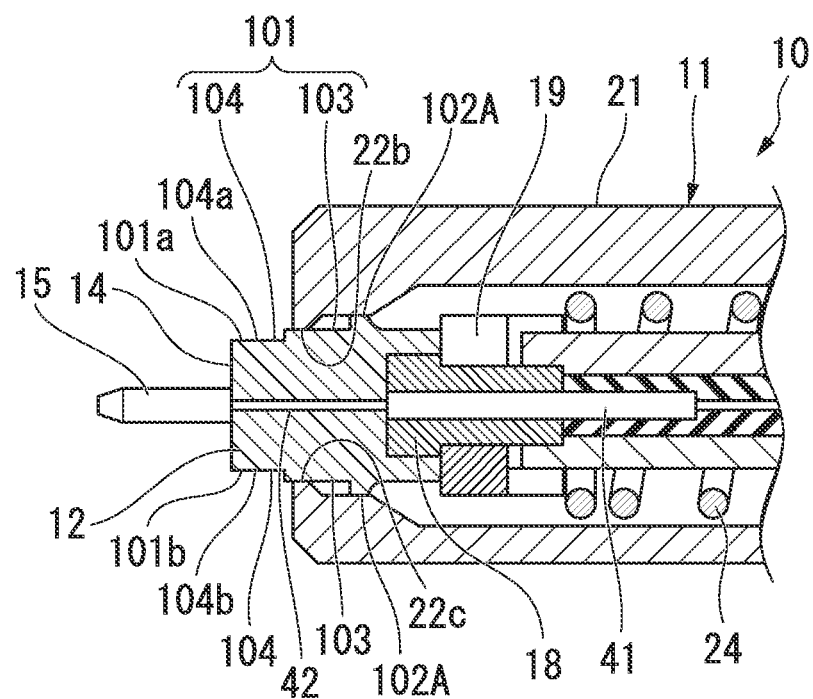
FIG. 14 is a side cross-sectional view showing a modified example of a locking convex portion of the ferrule.

FIG. 14 shows a modified example of the locking convex portion of the ferrule 12. Regarding a locking convex portion 102A shown herein, the front end position is the same as that of the locking convex portion 102 shown in FIG. 11 and the like. However, since the rear end of the locking convex portion 102A is not near the rear end of the ferrule 12, the locking convex portion 102A is different from the locking convex portion 102 in that the dimension in the front-rear direction is small.

The locking convex portion 102A has a function of stabilizing the position of the ferrule 12 present at the advanced position as in the locking convex portion 102.

Modified Example of Ferrule

Next, a ferrule 212 of a modified example which is applicable to the optical connector 10 according to the first embodiment will be described. The ferrule 212 of the modified example is different from the above-described ferrule 12 in that the ferrule 212 includes a lens 206. Identical reference numerals are used for the elements which are identical to those of the first embodiment, and the explanations thereof are omitted or simplified here.

Figure 15:
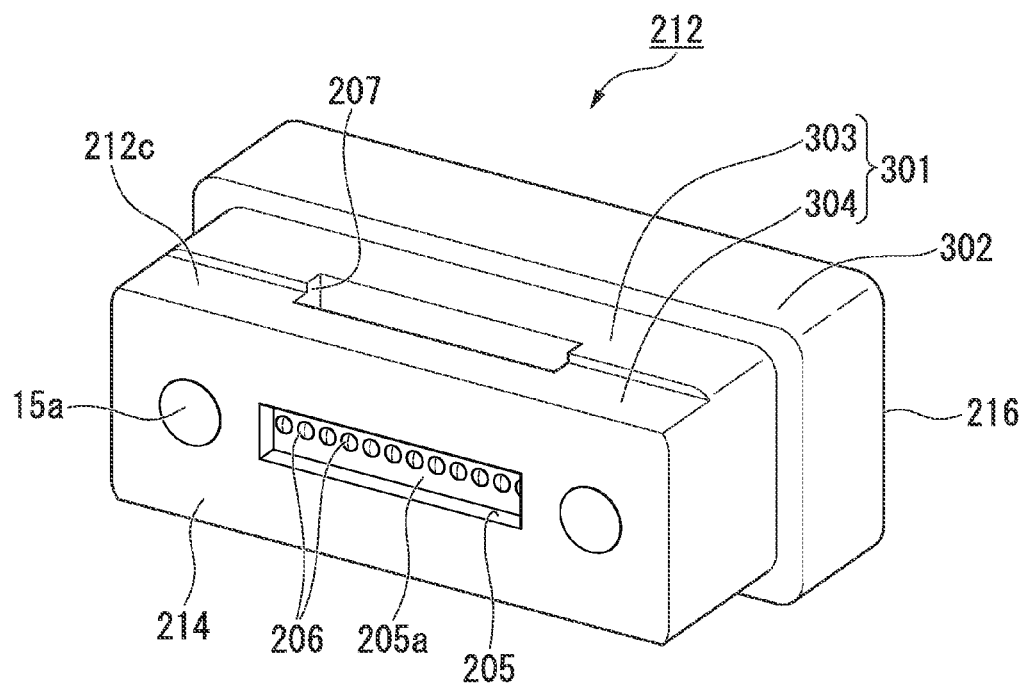
FIG. 15 is a perspective view showing a ferrule according to a modified example.
Figure 16:
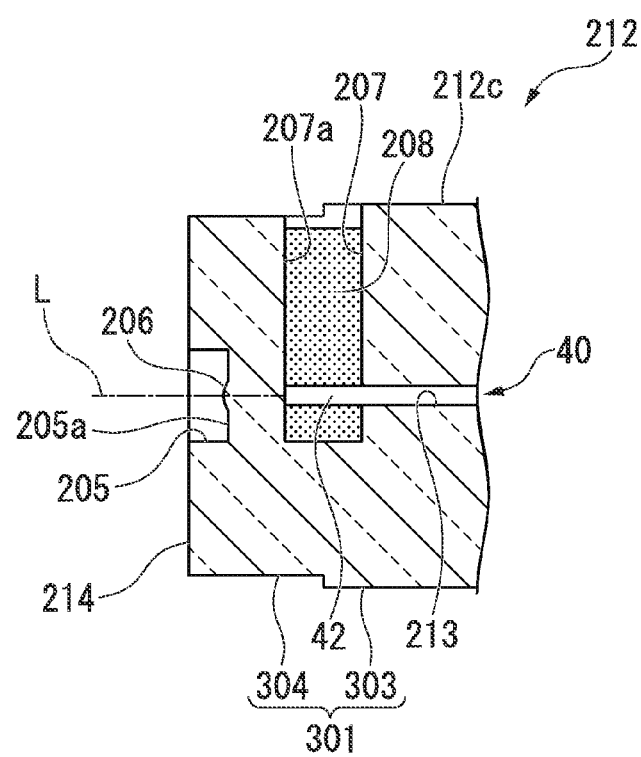
FIG. 16 is a cross-sectional view partially showing the ferrule shown in FIG. 15 into which the inserted optical fiber is to be inserted.

FIG. 15 is a perspective view showing the ferrule 212. FIG. 16 is a cross-sectional view partially showing the ferrule 212 into which the inserted optical fiber 40 is to be inserted.

The ferrule 212 is formed of a transparent member. The ferrule 212 is a single member made of a resin material. As a resin material used to form the ferrule 212, polyetherimide, polycarbonate, cyclic olefin copolymer, cyclic olefin polymer, or other transparent polymers may be adopted. Part of the ferrule 212 which serves as an optical path from the inserted optical fiber 40 to the lens 206 may be only formed of a transparent member.

As shown in FIG. 15, the ferrule 212 includes a body portion 301 and a locking convex portion 302.

The body portion 301 includes a front end surface (a joint end surface) 214 and a side surface 212c extending along with a front rear direction of the ferrule 212. Furthermore, the body portion 301 includes a base portion 303 and a thinned portion 304 which is provided at the front side of the base portion 303 so as to be thinner than the thickness of the base portion 303.

A locking convex portion 302 is formed at the rear side of the body portion 301 so as to protrude outward. The locking convex portion 302 includes a rear end surface 216 which is opposite to the front end surface 214.

A boot housing hole (not shown in the figure) is provided on the rear-end face 216 of the ferrule 212. The boot housing hole is configured to accommodate the ferrule boot 18 (refer to FIG. 1B) therein. An optical fiber insertion hole 213 (micro hole) is opened on the rear-end face 216. As shown in FIG. 16, one end portion 42 of the inserted optical fiber 40 is inserted into the optical fiber insertion hole 213. The inserted optical fiber 40 is fixed to the optical fiber insertion hole 213 by, for example, an adhesive.

A side surface recess 207 is provided on the side surface 212c of the ferrule 212. The side surface recess 207 is opened on the side surface 212c. The side surface recess 207 is communicated with the optical fiber insertion hole 213. The side surface recess 207 is formed in a rectangular shape in a plan view. An optical fiber stop plane 207a that faces rearward is formed in the side surface recess 207. The optical fiber stop plane 207a is positioned between the inserted optical fiber 40 and the lens 206. The front end of one end portion 42 of the inserted optical fiber 40 is brought into contact with the optical fiber stop plane 207a.

As shown in FIG. 16, the side surface recess 207 is filled with a refractive index matching material 208. Consequently, it is possible to control a refractive index in the optical path of light emitted from the front end of the inserted optical fiber 40. By use of, for example, a refractive index matching epoxy resin as the refractive index matching material 208, it is possible to fix the optical fiber inside the side surface recess 207. As a result, it is possible to prevent the front-end position of the inserted optical fiber 40 from being displaced during use.

A recess 205 is provided on the front-end face 214 of the ferrule 212. The recess 205 is depressed with respect to the front-end face 214. A plurality of lenses 206 are formed on the surface 205a that faces forward of the recess 205. The lenses 206 are accommodated in the recess 205 and do not protrude forward from the front-end face 214. The lenses 206 are located on the extension lines L of the inserted optical fibers 40. The lenses 206 are arranged to be optically aligned with corresponding optical fiber insertion holes (optical alignment).

The lenses 206 are molded integrally in one body which serves as part of the ferrule 212. The lenses 206 collimate light emitted from the front ends of the inserted optical fibers 40. The lenses 206 condense, on the front end of the inserted optical fiber 40, light emitted from the other ferrule that is butt-jointed to the ferrule 212. It is preferable that the focal point of the lens 206 be located on the optical fiber stop plane 207a.

Even in the case of using the ferrule 212 of the modified example in the optical connector 10 according to the first embodiment, the same effect can be obtained.

What is claimed is:

1. An optical connector to be connected to an optical connector of a counter connection part inside an optical connector adapter, comprising:
   a housing;
   a regulating protrusion protruding inward from the inner surface of the front end of the housing; and
   a ferrule which is secured to an optical fiber and is accommodated inside the housing so as to be movable in a butt-connection direction,
   wherein the ferrule comprises:
   a body portion with a joint end surface; and
   a locking convex portion formed at a rear side of the body portion so as to protrude from a side portion of the ferrule;
   the body portion comprises:
   a base portion having a side surface on which an opening communicating with an inner portion of the base portion is not provided, the side surface extending along the butt-connection direction of the ferrule, the base portion being disposed adjacently at a front side of the locking convex portion, the base portion having a first thickness in a thickness direction perpendicular to the butt-connection direction, the locking convex portion having a second thickness larger than the first thickness of the base portion; and
   a thinned portion, which is formed adjacently at a front side of the base portion and has a third thickness that is smaller than the first thickness;
   wherein when the ferrule moves forward in the butt-connection direction, the regulating protrusion and the base portion approach each other so that the regulating protrusion regulates the movement of the ferrule in the thickness direction; and
   wherein when the ferrule moves backward in the butt-connection direction, the regulating protrusion and the thinned portion separate from each other so that the movement of the ferrule in the thickness direction is not regulated by the regulating protrusion.

2. The optical connector according to claim 1, wherein a plurality of regulating protrusions is provided at upper and lower inner surfaces of the housing.

3. The optical connector according to claim 1, wherein the housing accommodates:
   an inserting optical fiber having an end portion fixed to an end surface of the ferrule at a joint portion, and another end portion connected to the optical fiber, and
   a joint reinforced portion which reinforces the joint portion.

4. An optical connector to be connected to an optical connector of a counter connection part inside an optical connector adapter, comprising:
   a housing;
   a regulating protrusion protruding inward from the inner surface of the front end of the housing; and
   a ferrule which is secured to an optical fiber and is accommodated inside the housing so as to be movable in a butt-connection direction,
   wherein the ferrule comprises:
   a body portion with a joint end surface; and
   a locking convex portion formed at a rear side of the body portion so as to protrude from a side portion of the ferrule;
   the body portion comprises:
   a base portion disposed adjacently at a front side of the locking convex portion, the base portion having a first thickness extending in a thickness direction perpendicular to the butt-connection direction, the locking convex portion having a second thickness larger than the first thickness of the base portion,
   a thinned portion, which is formed adjacently at a front side of the base portion and has a third thickness that is smaller than the first thickness, and
   a lens located on an extension line of the optical fiber,
   wherein when the ferrule moves forward in the butt-connection direction, the regulating protrusion and the base portion approach each other so that the regulating protrusion regulates the movement of the ferrule in the thickness direction; and
   wherein when the ferrule moves backward in the butt-connection direction, the regulating protrusion and the thinned portion separate from each other so that the movement of the ferrule in the thickness direction is not regulated by the regulating protrusion.

5. The optical connector according to claim 4, further comprising a side surface recess provided on a side surface of the body portion, the side surface extending along the butt-connection direction of the ferrule, the side surface recess being opened on the side surface, wherein an inserted optical fiber is fixed to the body portion so that one end portion of the inserted optical fiber is brought into contact with a surface of the side surface recess and so that another end portion of the inserted optical fiber is connected to the optical fiber.

6. An optical connector ferrule, which is secured to an optical fiber in a butt-connection direction, and which is accommodated inside a housing of an optical connector to be connected to an optical connector of a counter connection part inside an optical connector adapter, the ferrule comprising:
 a body portion with a joint end surface; and
 a locking convex portion formed at a rear side of the body portion so as to protrude from a side portion of the ferrule,
 the body portion comprising:
 a base portion having a side surface on which an opening communicating with an inner portion of the base portion is not provided, the side surface extending along the butt-connection direction of the ferrule, the base portion being disposed adjacently at a front side of the locking convex portion, the base portion having a first thickness in a thickness direction perpendicular to the butt-connection direction, the locking convex portion having a second thickness larger than the first thickness of the base portion; and
 a thinned portion that is adjacently in front of the base portion and has a third thickness smaller than the first thickness of the base portion;
 wherein the ferrule is movable in the butt-connection direction;
 wherein when the ferrule moves forward in the butt-connection direction, the base portion moves toward an inner surface of the housing and movement of the ferrule in the thickness direction is regulated as the base portion approaches the housing;
 wherein when the ferrule moves backward in the butt-connection direction, the movement of the ferrule in the thickness direction is released as the thinned portion separates from the housing.

7. An optical connector ferrule, which is secured to an optical fiber in a butt-connection direction, and which is accommodated inside a housing of an optical connector to be connected to an optical connector of a counter connection part inside an optical connector adapter, the ferrule comprising:
 a body portion with a joint end surface; and
 a locking convex portion formed at a rear side of the body portion so as to protrude from a side portion of the ferrule,
 the body portion comprising:
 a base portion disposed adjacently at a front side of the locking convex portion, the base portion having a first thickness in a thickness direction that is perpendicular to the butt-connection direction, the locking convex portion having a second thickness larger than the first thickness of the base portion;
 a thinned portion that is adjacently in front of the base portion and has a third thickness smaller than the first thickness of the base portion; and
 a lens located on an extension line of the optical fiber,
 wherein the ferrule is movable in the butt-connection direction;
 wherein when the ferrule moves forward in the butt-connection direction, the base portion moves toward an inner surface of the housing and movement of the ferrule in the thickness direction is regulated as the base portion approaches the housing,
 wherein when the ferrule moves backward in the butt-connection direction, the movement of the ferrule in the thickness direction is released as the thinned portion separates from the housing; and
 wherein the ferrule is a single molding product made of a resin material.

8. An optical connector ferrule according to claim 7, further comprising a side surface recess provided on a side surface of the body portion, the side surface extending along the butt-connection of the ferrule, the side surface recess being opened on the side surface,
 wherein an inserted optical fiber is fixed to the body portion so that one end portion of the inserted optical fiber is brought into contact with a surface of the side surface recess and so that another end portion of the inserted optical fiber is connected to the optical fiber.

* * * * *